United States Patent [19]

Taylor

[11] 3,916,027

[45] Oct. 28, 1975

[54] METHOD OF TREATING CANDIDA ALBICANS INFECTIONS IN POULTRY

[75] Inventor: Gregg W. Taylor, Murrayville, Ga.

[73] Assignee: A.H.P., Inc., Gainesville, Ga.

[22] Filed: Mar. 16, 1973

[21] Appl. No.: 342,290

[52] U.S. Cl. .................................................. 424/329
[51] Int. Cl.² ........................................ A61K 31/14
[58] Field of Search ................................... 424/329

[56] References Cited
UNITED STATES PATENTS
3,231,466   1/1966   Hoffmann ........................... 424/329

OTHER PUBLICATIONS
U.S. Dispensatory–25th edition (1955) p. 859.
Standen–Chem. Abst. Vol. 48 (1954) p. 1569f.
Amato et al.–Chem. Abst. Vol. 73 (1970) p. 22505c.
Alkiewicz et al.–Chem. Abst. Vol. 59 (1963) p. 11935c.
Miyazawa–Chem. Abst. Vol. 51 (1957) p. 8277f.
Miyazawa–Chem. Abst. Vol. 52 (1958) pp. 17365i & 17366a.

Primary Examiner—Norman A. Drezin
Attorney, Agent, or Firm—Christen & Sabol

[57] ABSTRACT

A premix concentrate for addition to animal and poultry feed which consists essentially of gentian violet, which is a selective fungicidal mold inhibitor of Candida albicans and the remainder inert ingredients.

Gentian violet is added to poultry drinking water and is used as a poultry water sanitizer.

A process for the analysis of residue gentian violet in manure and a process for the checking of such analytical procedure.

3 Claims, No Drawings

METHOD OF TREATING CANDIDA ALBICANS INFECTIONS IN POULTRY

BACKGROUND OF THIS INVENTION

1. Field of This Invention

This invention relates to animal and poultry feeds, poultry drinking water and poultry water sanitizer which contains a selective fungicidal mold inhibitor of Candida albicans.

This invention further relates to a process for the analysis of residual gentian violet and a process for the checking of such analytical procedures.

2. Prior Art

A mixture of pentamethylpararosaniline chloride and hexamethylpararosaline chloride (gentian violet) has been used in tablet form in human treatment in oxyuriasis when there was no accompanying Ascaris (roundworm) infection and as an efficient and relatively non-toxic anthelmintic in Oxyuris (pin-worm) infestations. Gentian violet has been used internally in humans as an anthelmintic (that is, to expel intestinal worms) and topically on humans as an antimicrobial. A methylrosaniline chloride (gentian violet) solution (10 gm. of methylrosaniline chloride, 100 ml. of alcohol and 1000 ml. of water) has been used topically on humans as a local anti-infective. Methylrosaniline chloride tablets have been used internally in humans for intestinal roundworms.

Gentian violet has been used topically on animals as a 0.5 percent aqueous solution or as a one percent alcohol solution for the treatment of burns, chronic ulcers and mycotic skin afflications, or used as a 2.5 percent solution in the treatment of contagious pustular dermatitis in sheep.

Hexamethylpararosaniline chloride or crystal violet (gentian violet) is a dye, as is pentamethylpararonsaniline chloride or methyl violet.

U.S. Pat. No. 2,946,722 discloses a composition consisting essentially of a nontoxic water-soluble salt of propionic acid and lesser amounts of methyl rosaniline, ferric choline citrate, menadione sodium bisulfite and trace-elements (Cu, Co, Mn, Mg, Zn and I) compounds. The compositions usually contains 0.1 to 0.5 percent of methyl rosaniline. The composition is used to treat non-specific diseases in poultry. The examples given of such non-specific diseases were CRD (air-sac infection), enteritis, anemia, gizzard erosion, blue comb and mud fever in turkeys, epidemic tremor and hemorrhagic diseases. Non-specific diseases are defined as those which are not readily identified as being caused by a specific organism. Specific diseases respond to specific treatments, or may be controlled by vaccination. The sodium propionate was used as an antifungal and an antibacterial agent. Methyl rosaniline complements the sodium propionate to provide a higher degree of effectiveness against a broader spectrum of harmful microorganisms. Methyl rosaniline and sodium propionate, in combination with other listed ingredients, are effective to reduce the growth of undesirable microorganisms without materially reducing the growth of and activity of the normal coliform bacteria present in the intestinal tract. The only bacteria in the intestinal tract mentioned as being reduced in number are lactobacilli and entercocci. In sum total, the composition provided a varied coverage of antibacterial, antifungal, anti-anemic, antihemorrhagic, and stress-compensating factors in a well-balanced formula.

The composition of U.S. Pat. No. 2,946,722 can be added to poultry drinking water and can be used as a dry supplement in feeds and the like. A solution can be made by adding 1.6 pounds of the soluble form of the composition to one gallon of water. About ½ pound. of the composition can be added to 100 pounds of poultry feed for preventive effect and for remedy of infections in early stages. The treatment at regular levels may be applied continuously. Higher levels of the composition can be used after the disease has become more evident.

U.S. Pat. No. 2,946,722 preferred a free-choice system where the product was in the form of a soft, milk-base food block containing the composition. This preferred free-choice system was based on the individual bird consuming the product as the need arose. Problems with feed and water addition were cited and stressed.

U.S. Pat. No. 3,231,466 discloses a composition for treating animals consisting essentially of a non-toxic, water-soluble salt of propionic acid, methylrosaniline chloride, phthalysulfacetamide, sodium bisulfite, iron, cobalt, and copper choline citrates, and a specific organic iodide. The composition is used in treating non-specific diseases and sub-clinical infections. The composition includes the ingredients of U.S. Pat No. 2,946,722 and several other ingredients.

BROAD DESCRIPTION OF THIS INVENTION

As used herein, the term "poultry" means domestic fowls including chickens, ducks, turkeys, geese, etc.

As used herein, the term "animal" includes domestic pigs, other swine, cattle, sheep goats, rabbits, etc.

As used herein the term "gentian violet" is hexamethyl-pararosaniline chloride or a mixture of at at least 90 percent of hexamethylpararosaniline chloride with minor portions of pentamethylpararosaniline chloride and/or tetramethylpararosaniline chloride.

Gentian violet is a dark green powder or greenish, glistening pieces with a metallic luster. Gentian violet is soluble in water, chloroform and ethanol.

Other names for gentian violet are methyl rosaniline chloride and crystal violet.

Gentain violet inhibits the growth of and destroys the Candida albicans without materially reducing the growth of and activity of the normal coliform bacteria present in the intestinal tract, which are necessary in synthesizing important nutritional factors.

One aspect of this invention involves the use of gentian violet, a selective fungicidal mold inhibitor, as an additive to poultry feed. The gentian violet specifically is a selective fungicidal mold inhibitor of Candida albicans.

This aspect of this invention involves a poultry feed supplement of a food nature, and is a new poultry drug use.

The gentian violet is preferably used in the form of a premix concentrate, which can be added to the complete feed as needed. The most preferred premix concentrate contains corn cob fractions, vegetable oil, diatamaceous silica (e.g., Micro-Cel E), and 1.55 percent of gentian violet.

The concentrate of gentian violet in the premix concentrate can easily be as high as 60 percent; it is preferably between 0.1 and 10 percent and is most preferably 1.55 percent. A useful gentian violet premix concentrate is premix ViGen (concentrate) obtainable from A.H.P., Inc., Gainesville, Georgia.

The premix concentrate can contain any material that can be used in complete poultry feed. The premix concentrate can be used in the form of a liquid or solid admixture. The liquid is best in the form of a very viscous suspension or similar semi-fluid. Preferably a solid premix concentrate is used even though it may contain a liquid material such as vegetable oil which is nutritional, which tends to hold the solid premix concentrate components together in an agglomerated form, and which reduces the dust factor in the premix.

The premix concentrate is used for treatment of Candida albicans by adding it to the complete poultry feed for a period of about seven days, although the time can be more or less as needed. When the premix concentrate contains 1.55 percent of gentian violet, preferably two pounds of the premix is used per ton of complete poultry feed. That reflects a preferred concentration of about 0.00155 percent of gentian violet in the complete poultry feed. Effective concentrations of gentian violet are quite wide, but an example of the range is 0.0001 to 0.01 percent of gentian violet per ton of complete poultry feed.

The above treatment times and concentrations in the complete poultry feed apply even when the gentian violet is directly admixed with the complete poultry feed without going through the intermediate premix concentrate form.

The premix is used for prevention of Candida albicans by adding it to the complete poultry feed on a continuous basis. (After treatment with the premix, it should be used on a continuous basis to achieve prevention.) When the premix contains 1.55 percent of gentian violet, preferably one pound of the premix is used per ton of complete poultry feed. That reflects a preferred concentration of 0.00077 percent of gentian violet in the complete poultry feed. Effective concentrations of gentian violet are quite wide, but an example of the range is 0.00005 to 0.005 percent of gentian violet per ton of complete poultry feed.

The above treatment times and concentrations in the complete poultry feed apply even when the gentian violet is directly admixed with the complete poultry feed without going through the intermediate premix concentrate form.

Any complete poultry feed or basal poultry feed can be used. It can contain, for example, ground yellow corn, soybean oil meal, steamed bone meal, ground limestone, iodized salt, manganese sulfate, Vitamin A oil, dry Vitamin D-3, riboflavin, Vitamin B-12 and niacin. It can also contain, for example, fish meal and meat meal.

Another aspect of this invention involves the use of gentian violet, a selective fungicidal mold inhibitor, as an additive to animal feed. The gentian violet specifically is a selective fungicidal mold inhibitor of Candida albicans.

The gentian violet is preferably used in the form of premix concentrate, which can be added to the complete feed as needed. The most preferred premix concentrate contains corn cob fractions, vegetable oil, diamaceous silica (e.g., Micro-Cel E), and 1.55 percent of genetian violet.

The concentration of gentian violet in the premix concentrate can easily be as high as 60 percent, it is preferably between 0.1 and 10 percent and is most preferably 1.55 percent. A useful gentian violet premix concentrate is VI Gen obtainable from A.H.P., Inc., Gainesville, Georgia.

The premix concentrate can contain any materials that can be used in a basal complete animal feed. The premix concentrate can be used in the form of a liquid or solid admixture. The liquid is best in the form of a very viscous suspension or similar semi-fluid. Preferably a solid premix concentrate is used even though it may contain a liquid material such as vegetable oil which is nutritional and tends to hold the solid premix concentrate components together in an agglomerated form.

The premix concentrate is used for treatment of Candida albicans by adding it to the complete animal feed for a period of about seven days, although the time can be more or less as needed. When the premix concentrate contains 1.55 percent of gentian violet, preferably two pounds of the premix is used per ton of complete animal feed that reflects 0.00156 percent gentian violet in complete animal feed. Effective concentrations of gentian violet are quite wide, but an example of the range is 0.0001 to 0.01 percent of gentian violet per ton of complete animal feed.

The above treatment times and concentrations in the complete animal feed apply even when the gentian violet is directly admixed with the complete animal feed without going through the intermediate premix concentrate form.

The premix is used for prevention of Candida albicans by adding it to the basal or complete animal feed on a continuous basis. (After treatment with the premix, it should be used on a continuous basis to achieve prevention.) When the premix contains 1.55 percent of gentian violet, preferably one pound of the premix is used per ton of complete animal feed. That reflects a preferred concentration of 0.00077 percent of gentian violet in the complete animal feed. Effective concentration of gentian violet are quite wide, but an example of the range is 0.00005 to 0.005 percent of gentian violet per ton of complete animal feed.

The above treatment times and concentrations in the complete animal feed apply even when the gentian violet is directly admixed with the complete animal feed without going through the intermediate premix concentrate form.

Any complete animal feed or basal animal feed can be used; it can contain, for example, any of the following ingredients: mogul starch, iodized salt, dry Vitamin D-3, riboflavin, Vitamin B-12, niacin, meat meal, D calcium pantothenate, cracked or milled grains such as corn, wheat, oats, barley and the like, dried molasses, dried sorghum, soybean meal, cottonseed meal, peanut meal, fish meal, essential amino acids such as lysine, peptides and polypeptides containing essential amino acids, casein, soya bean protein, vitamins such as Vitamins, A, D, E and K, mineral nutrients such as sodium chloride, ferrous salts, magnesium sulfate and calcium salts, proteins, buffers, dextrose, sucrose, lactose, maltose, corn syrup solids, hydrolyzed cereal solids, hay, etc.

An exemplary cattle feed is 73 percent rolled shelled corn, 20 percent ground corn cobs, and a supplement containing soybean meal, alfalfa meal, cane molasses, urea, salt, dicalcium phosphate, Vitamin A concentrate and Vitamin D concentrate.

A further aspect of this invention involves the use of gentian violet, a selective fungicidal mold inhibitor, as an additive to poultry water. This aspect of this invention involves a poultry water additive and is a new poultry drug use.

The gentian violet is preferably used in the form of a liquid premix concentrate, which can be added to the poultry water as needed or made into a stock solution and added as needed. The most preferred concentrate contains water and 1.55 percent of gentian violet, but the concentration usually ranges from 0.1 to 10 percent. Although any concentration can be used. The key is to get a sufficiently high concentration in the poultry water itself. The concentration of gentian violet in the poultry water itself should be between 0.001 and 0.1 percent.

A useful gentian violet premix concentrate is ViGen-Soluble (concentrate) obtainable from A.H.P., Inc., Gainesville, Georgia.

The treatment period is preferably seven days but can be any length of time needed to achieve the desired effect.

The gentian violet can be added directly to the poultry water, in which case the above treatment times and concentrations also apply.

This aspect of this invention can also be used with animals.

Another aspect of this invention involves the use of gentian violet, a selective fungicidal mold inhibitor, as a poultry water sanitizer. It aids in the reduction of Candida albicans contamination in water lines and poultry watering equipment. This aspect of this invention involves a poultry water additive and is a new poultry drug use.

The gentian violet is preferably used in the form of a liquid premix concentrate, which can be added to the poultry water on a regular basis, for example, once a week. It can also be made up into a stock solution and added to the poultry water. The most preferred concentrate contains water and 0.3875 percent of gentian violet, but the concentration usually ranges from 0.05 to 5 percent. Although any concentration can be used. The key is to get a sufficiently high concentration in the poultry water itself. The concentration of gentian violet in the poultry water itself should be between 0.001 and 0.05 percent.

A useful gentian violet premix concentrate is Aqua Gen (concentrate) Water Sanitizer obtainable from A.H.P., Inc., Gainesville, Georgia.

The treatment period is preferably one day every week but can be on any basis as needed to achieve the desired effect.

The gentian violet can be added directly to the poultry water, in which case the above treatment times and concentrations also apply.

This aspect of this invention can also be used with animals.

Another name for Candida albicans is Monila albicans. Candida albicans, a yeast like organism, is the usual cause of moniliasis pneumonia, meningitis and other forms of moniliasis. It is normally saprophytic but may become pathogenic after the administration of certain antibiotics. Antibiotics are often used in relatively large amounts in animal and poultry feeds. The use of the antibiotics allow molds and fungi to grow. The above processes of this invention are useful in eliminating and preventing internal infestation of Candida albicans, for example, in the intestines, and infestation of Candida albicans in drinking water.

This invention still further involves a process for the analysis of the residual gentian violet in feed or manure. The process includes extracting substantially all of the fat in the feed or manure using a fat solvent. (The extraction is preferably done at room temperature. The fat solvent is separated from the feed or manure, preferably, by means of centrifuging.) The fat-extracted feed or manure is dried. A known amount of acidified ethanol is admixed with the fat-extracted feed or manure, and the resultant admixture is left standing (preferably for 48 hours). The acidified alcohol is separated from the resultant admixture. The amount of gentian violet in the acidified alcohol is determined by spectrophotometrical comparison with acidified alcohol standards containing set amounts of gentian violet.

The extraction, separation and determination steps are repeated until no gentian violet is found to be present in the acidified alcohol, the total of the gentian violet found from the determination steps being the total amount of gentian violet present in the feed or the manure.

This process is preferably used for analysis of poultry feed or manure.

Preferably the fat extraction step involves first extracting the fat from the manure or feed at least once with petroleum ether and then extracting the fat from the manure or the feed at least once with hexane.

The preferred fat solvent is petroleum ether, when a one step extraction process is used, and is the use of petroleum ether, in the first step and the use of hexane in the second step, when a two step extraction step is used. Other fat solvents can be used.

All or some of said feed is fed to the animals or poultry, a known amount of gentian violet being present in said feed.

The remaining portion, if any, of the feed and after consumption and the manure are separately processed according to this process. The total of the gentian violet found in the remaining portion, if any, of the feed and the manure is compared with the known amount of gentian violet present in the feed before it is fed to the animals or the poultry, the difference being a measure of the gentian violet retained by the animal or the poultry.

The fat extraction is preferably done at room temperature. The fat solvent is preferably separated by means of centrifuging.

Preferably the acidified alcohol contains 1 ml. of concentrated HCl per 100 ml. of ethanol. Other acids such as concentrated sulfuric acid and concentrated nitric acid can be used in place of the concentrated HCl.

Other suitable solvents can be used in place of the acidified alcohol.

The determinations can be made by any conventional method, but preferably are made using a spectrophotometer such as a Beckman spectrophotometer.

This process can be used to analyze the amount of the residue of gentian violet in animal or human manure or feed (food).

This invention also involves a process for checking the accuracy of a process for the analysis of residual gentian violet in feed or manure of animal or poultry. The process includes adding a known amount of various aqueous solutions containing known amounts of gentian violet to known amounts of feed or manure known not to contain any gentian violet to form spiked samples. Substantially all of the fat in each of the spiked samples of feed or manure is extracted using a fat solvent. Preferably the fat extraction step involves first extracting the fat from the manure or the feed at least once with petroleum ether and then extracting the fat from the manure or the feed at least once with hexane. A known amount of acidified ethanol is admixed with each of the spiked examples, letting the resultant admixture stand (preferably for 48 hours). Preferably the extraction is done at room temperature. Preferably the acidified alcohol contains 1 ml. of concentrated HCl per 100 ml. of ethanol. Other acids such as concentrated sulfuric acid and concentrated nitric acid can be used in place of the concentrated HCl. The acidified alcohol is separated from each of the resultant admixtures. Preferably the separation is achieved by means of centrifuging. The amount of gentian violet in each of the acidified alcohols is determined by spectrophotometrical comparison with acidified alcohol standards containing varied amounts of gentian violet. The extraction, separation and determination steps are repeated until no gentian violet is found to be present in the acidified alcohol, the total of gentian violet for each sample giving the accuracy of the procedure for the analysis of residual gentian violet in the manure or feed by direct comparison with the known amount of gentian violet placed in each sample.

Other suitable fat solvents can be used in place of the hexane and the acidified alcohol.

The determinations can be made by any conventional method, but preferably are made using a spectrophotometer such as a Beckman spectrophotometer.

This process can be used to check or determine the accuracy of the process herein for analyzing the amount of the residue of gentian violet in animal or human manure of feed (food).

A check on the acidified ethanol extraction steps involves using a spiked samples which contains no gentian violet so as to be a blank sample. The acidified ethanol batches from the spiked samples are compared with the acidified ethanol batch from the blank sample.

DETAILED DESCRIPTION OF THIS INVENTION

The following examples illustrate this invention.

EXAMPLE 1

Chickens infected with Candida albicans were fed, for seven days, a complete poultry feed containing two pounds of premix concentrate per ton of complete poultry feed. The premix concentrate contained 15 percent of vegetable oil, 5.45 percent of MicroCel E, 1.55 percent of gentian violet and 78 percent of corn cob fractions. The complete poultry feed contained:

| Ingredients | lb/100 lb. |
|---|---|
| Ground yellow corn | 64.5 |
| Soybean oil meal (50% protein) | 32.0 |
| Steamed bone meal | 2.0 |
| Ground limestone | 1.0 |
| Iodized salt | 0.5 |
| | gm/100 lb. |
| Manganese sulfate (feed grade) | 11.4 |
| Vitamin A oil (10,000 I.U./gm) | 22.7 |
| Dry Vitamin D-3 (1,6550 I.C.U./gm) | 22.7 |
| Riboflavin | 0.15 |
| Vitamin B-12 (3 mg.lb.) | 45.4 |
| Niacin | 1.0 |

EXAMPLE 2

The chickens of Example 1 were fed thereafter a complete poultry feed containing one pound of the premix concentrate described in Example 1 per ton of complete poultry feed (described in Example 1).

EXAMPLE 3

Hogs infected with Candida albicans were fed, for seven days, a complete hog feed containing two pounds of premix concentrate per ton of complete hog feed. the premix contained 10 percent of vegetable oil, 4.45 percent of Micro-Cel E, 1.55 percent of gentian violet and 84 percent of corn cob fractions. The complete hog feed was the same as the one used in Example 1.

EXAMPLE 4

The hogs of Example 3 were fed thereafter a complete hog feed containing one pound of the premix concentrate (described in Example 3) per ton of complete hog feed (described in Example 3).

EXAMPLE 5

240 ml. of a premix concentrate containing water and 1.55 percent of gentian violet were diluted to make one gallon of stock solution. The gallon of stock solution and a number of gallons of water were metered through a proportioner, at a ratio of one ounce of stock solution per gallon of water, to poultry drinking trays as needed over a seven-day period.

EXAMPLE 6

Example 1 was repeated using the following chicken feed:

| Ingredient: | Weight Percent |
|---|---|
| Assay protein ADM | 35.00 |
| Wheat middlings | 40.91 |
| Fishmeal (menhaden) | 8.40 |
| Corn distillers solubles | 3.00 |
| Dehydrated alfalfa meal | 3.00 |
| Calcium carbonate | 2.90 |
| Dicalcium phosphate | 2.90 |
| Choline concentrate (25%) | 1.10 |
| MHA[1] | 0.70 |
| Glycine | 0.30 |
| Vitamins B and K | 0.50 |
| Iodized salt | 0.50 |
| Aureomycin concentrate | 0.14 |
| Penicillin concentrate | 0.14 |
| Coccidistat | 0.12 |
| Nitrofurazone concentrate | 0.06 |
| Vitamin A (10,000 IU/g.) | 0.08 |
| Vitamin D (7500 ICU/g.) | 0.30 |
| Trace mineral mixture | 0.20 |
| Santoquin[2] | 0.02 |
| Corn Oil | 0.70 |
| Total | 100.00 |

[1]Registered trademark for calcium salt of 2-hydroxy-4-methylthiobutyric acid.
[2]Registered trademark for an antioxidant, G-ethoxy-2,2,4-trimethyl-1,2-dihydroquinoline.

EXAMPLE 7

Example 1 was repeated using the following turkey feed:

| | Pounds |
|---|---|
| Ground yellow corn | 1105 |
| Soybean mean (50% protein) | 540 |
| Animal fat (stabilized 2 tallow) | 100 |
| Menhaden fish meal | 60 |
| Fish solubles, condensed (50% solids) | 40 |

-Continued

| | |
|---|---|
| Alfalfa leaf meal (20% protein) | 60 |
| Dicalcium phosphate (20% P, 24% Ca) | 40 |
| Oyster shell flour | 19.9 |
| Salt | 10 |
| Vitamin Premix | 20 |

EXAMPLE 8

240 ml. of a premix concentrate containing water and 0.3875 percent gentian violet were diluted to make one gallon of stock solution. The gallon of stock solution and a number of gallons of water were metered through a proportioner, at a ratio of one ounce of stock solution per gallon of water delivered. The gentian violet addition was one day every week.

EXAMPLE 9

FEEDING AND HANDLING OF THE CHICKENS IN THE TECHNIQUE FOR GENTIAN VIOLET EXTRACTION FROM MANURE AND FEED

Chickens were placed in individual isolation cages. One control chicken was designated for each two chickens placed on the gentian violet medicated feed. Feed for each individual chicken was prepared containing the proper amount of gentian violet (14ppm). Feed slightly in excess of the amount each chicken would consume in a 7-day feeding period was prepared. Each chicken was fed exclusively from the container of feed prepared for it. At the end of the 7-day feeding period the feed was withdrawn and the chickens retained in the fasting stage for an additional 2 days to insure maximum emptying of the digestive system. At the end of the 2-day fasting period the chickens were removed from the cages and sacrificed. All waste feed in the cage dropping pan and feed cup was carefully recovered and added to the portion of the feed unconsumed by the particular chicken during the 7-day feeding period. This total residue feed sample was then extracted to determine the amount of gentian violet not consumed by the individual chicken. This is an essential determination in that the peculiar feeding habits of chickens allow for concentration of the gentian violet particles in the unconsumed feed. It is necessary to know what portion of the gentian violet added to the feed, when the feed is prepared, remains in the feed at completion of the feeding period. All droppings are removed from the dropping pan and the cage floor was scraped and brushed to collect the maximum amount of manure produced by the chicken. Droppings were weighed, air-dried, and ground according to the instructions set forth below in the Gentian Violet Extraction Procedure for extraction of gentian violet from manure.

PREPARATION OF FEED CONTAINING VIGEN PREMIX CONCENTRATE FOR TEST CHICKENS.

Leghorn type chickens approximately 20 weeks of age are used for the trial. These birds consume approximately 0.2 lb (75–90 gm) of feed per day. Slightly more feed is prepared than it is anticipated each bird would consume in 7 days. The feed for each test bird in the trial was prepared as an individual batch.

1 lb. (454 gm batches) of 14ppm gentian violet feed were prepared as such:

| | | |
|---|---|---|
| Weigh | 0.454 gm | of ViGen premix concentrate |
| Weigh | 453.546 gm | of feed |
| | 454.000 gm | of admixture |

The ViGen premix concentrate contained corn cob fractions, vegetable oil, diatomaceous silica (i.e., Micro-Cel E), and 1.55 percent of gentian violet. The feed described in Example 1 was used in preparing the gentian violet feed. The feed containing ViGen premix concentrate were placed in a one quart canning jar (or other suitable glass container) and a 10 rubber stopper was inserted in each jar. The screw caps were secured tightly on the jars and the contents were hand mixed (turn-and-shake movement) for 15 minutes to insure uniform distribution of the ViGen throughout the feed.

The medicated feed should not be mixed in a metal or plastic container or mixer as gentian violet has a tendency to adhere to metal and plastic surfaces that are not not well grounded. This may result in loss of proper concentration of gentian violet in the feed during preparation.

The following is a calculation of gentian violet concentrations in feed medicated with the ViGen premix concentrate: 1 ton (2000 lbs) of ViGen premix concentrate contains 31 lbs (14074 gm) of gentian violet with guaranteed activity of 96% purity (USP standard). 1 lb (454 gm) of ViGen premix concentrate contains 7 gm of gentian violet (7 gm × 96% = 6.72 gm guaranteed active). 1 lb (454 gm) of ViGen premix concentrate in one ton of complete feed provides 227 mg (.227gm) of ViGen premix concentrate per pound of complete feed. 227 mg ViGen premix concentrate per pound of complete feed provides 3.5 mg of gentian violet per pound of complete feed = 7 ppm in that feed. 454 mg ViGen premix per pound of complete feed = 7.0 mg of gentian violet per pound of complete feed = 14ppm in that feed. This is equivalent to .0148 mg gentian violet per gram of feed.

So the gentian violet activity in the feed can be calculated as 0.0148 mg of gentian violet per gram of feed when working at the 14ppm level.

GENTIAN VIOLET EXTRACTION PROCEDURE i. Preparation of manure samples

Each entire wet manure sample was weighed, in an open glass pan and air dried in the dark until consistency of the sample would allow grinding in a mortar. Each entire sample was ground with mortar and pestle to the finest possible particle size. Each finely ground manure sample was placed in the glass pan again and air dried in the dark to a constant weight. A control manure sample known not to contain any gentian violet was also subjected to this procedure, control and medicated manure samples were handled in exactly the same manner. The dry weight of each manure sample was recorded. Each dry manure sample was placed in a one quart stoppered container (1 quart fruit jar), and a NO. 10 rubber stopper was placed in each jar with the sample. Each jar was tightly capped and hand mixed for 15 minutes to insure a homogenous mixture in each jar. The control and medicated samples were mixed in separate containers.

ii. Preparation of feed samples

Special handling of the feed was not required when making gentian violet extractions from feed except that residual feed should be thoroughly mixed prior to weighing samples. It is necessary that the technican have at hand a sample of the unmedicated feed to use as a control when working with the gentian violet medicated feed. The gentian violet in the feed samples was extracted using the technique for manure extraction starting with the following fat extraction step and carried out the rest of the entire extraction procedure. Calculations were made in the same manner as listed for the manure.

iii. Fat Extraction Procedure

One 10 gm sample of the control manure was weighed and placed in a 100 ml centrifuge tube. Six 10 gm samples of each of the medicated manure samples were weighed and placed in six 100 ml centrifuge tubes. 60 ml of petroleum ether were added to each of the 7 centrifuge tubes and tubes were sealed tightly with rubber stoppers. Each tube was hand shaken for 2 minutes. The rubber stoppers were removed from the tubes and any solid material adhering to the stopper were flushed into the centrifuge tube using a minimum of petroleum ether. The tubes were placed in a centrifuge and centrifuged for 5 minutes at 2000 rpm. The petroleum ether from the centrifuged samples was decanted and discarded. The petroleum ether washing (or extraction) was repeated three times.

Upon completion of the petroleum ether washings, 60 ml of hexane were added to each sample in the centrifuge tubes. The tubes were stoppered and hand shaken for 2 minutes. The solid particles were washed from the stoppers into the tubes. The tubes were placed in a centrifuge and centrifuged for 5 minutes at 2000 rpm. The liquid was decanted and discarded. The hexane washings (or extractions) was repeated three times. After completion of the hexane washings, the centrifuged samples were placed in an air jet and evaporated for 30 minutes.

The air dried samples from the centrifuge tubes were transfered to 250 ml flasks with ground glass stoppers. The tubes were flushed with sufficient petroleum ether to remove all solid matter from the tubes. The flasks were placed in an air jet and the samples were evaporated until dry (i.e., no detectable odor of petroleum ether).

iv. Acid-alcohol extraction of gentian violet

Acid-alcohol solution containing 100 ml of ethyl alcohol (denatured 95%) plus 1 ml concentrated HCl were prepared. (4 ml acid-alcohol per gram of sample to be extracted were used.) 40 ml of acid-alcohol were added to each of the samples in the flasks. A small size magnet was inserted into each flask. The flasks were loosely stoppered and the samples were mixed on a magnetic mixer for 30 minutes. At the end of the 30 minute mixing period, the flasks were set in the dark and let stand for 48 hours to digest the samples. After completion of the 48 hours digestion period, the samples were set on the magnetic mixer and again mixed for 30 minutes. The liquid from the flasks were decanted into centrifuge tubes, making sure to drain all liquid possible from the solids in each flask. The liquid samples were centrifuged for 5 minutes at 2000 rpm.

v. Reading of the samples

A portion of the control sample and each of the medicated samples were decanted into cuvettes. A spectrophotometer (Beckman) was zeroed using the control sample to blank out all color in the solution attributable to the feed ingredients contained in the control manure sample. After the spectrophotometer has been zeroed with the control sample, optical density of each of the medicated samples were read at 590 mu. The optical density of each medicated sample and the ml (volume) of acid-alcohol used to extract each sample were recorded. Each extraction of each sample was individually calculated as mcg/ml × ml for each individual extraction. (Do not combine the samples and read as a unit.)

(If on this initial reading, the medicated samples read in the optical density range of 0.800 to 1.000, dilute the control and medicated samples in the cuvettes 1:1 with acid-alcohol, zero the spectrophotometer again and re-read the optical density (O.D.) of the medicated samples. Note the dilution and when calculating this first extraction; multiply the (mcg) of gentian extracted by 2.)

vi. Second extraction

The acid-alcohol solutions from the first extraction were discarded. The solids from the centrifuge tubes were washed into the flasks using an aliquot of 40 ml of acid-alcohol solution. The flask was placed on the magnetic mixer and mixed for 30 minutes. The liquid from the flasks were decanted into clean centrifuge tubes, making sure each sample was well-drained. Each sample was centrifuged for 5 minutes at 2000 rpm. A portion of each centrifuged liquid was decanted into a cuvette and second readings as in the first extraction were made on the spectrophotometer. Always zero the spectrophotometer with the control sample before reading the O.D. of the medicated samples. (It should not be necessary to dilute this second extraction prior to reading optical density). The extraction procedure was continued until a 0.000 optical density reading was obtained for each of the medicated samples. One additional extraction was run on each 0.000 optical density sample to insure that the sample was actually zeroed out.

Calculation of gentian violet extraction 1 ppm = 1μg (or mcg)/ml.

A standard curve for gentian violet in acid-alcohol was prepared (such as the one prepared from the standard solutions of Example 9 or 10). The optical density for 1 ppm was determined from the standard curve.

$$\frac{\text{O.D. of sample}}{\text{O.D. of 1 ppm (from curve)}} \times \frac{\text{mls of acid} - EtOH \text{ used}}{\text{for the extraction}} = \frac{\mu g \text{ (or } mc_g) \text{ gentian violet}}{\text{recovered per extraction}}$$

Each extraction was separately calculated. All extractions for each sample run were totaled to arrive at the total ug of gentian violet extracted from each sample.

The total ug extracted from all samples was totaled and divided by the number of samples in order to determine the average ug extracted.

$$\frac{\text{gm (air dry) in total manure sample}}{10 \text{ gm (am't used in each sample extracted)}} = \frac{\text{number of 10 gm samples in}}{\text{total air dry manure sample.}}$$

Average ug per 10 gm sample × number of 10 gm samples = total ug of gentian violet extracted from manure sample. (convert to mg.)
mg in feed (prepared for trial) − mg recovered (from residual feed) = mg consumed by bird.

$$\frac{\text{mg recovered from manure}}{\text{mg consumed by the bird}} = \frac{\text{\% gentian violet recovered from}}{\text{the manure of the bird.}}$$

The above example represents the preferred embodiment of this aspect of this invention.

EXAMPLE 10

A feed identical to that of Example 11 and in the same amount was used. 193.5 gm residual feed remaining at end of trial for each pound of starting feed. The feed contained 14 ppm gentian violet when prepared. 50% of the feed was extracted for representative concentration in total feed sample.

$$\frac{96.75 \text{ gm}}{6} = 16.125 \text{ gm per sample}$$

16.125 gm × 4 ml acid-alcohol/gm = 65 ml acid-alcohol to be used per extraction.

One 16.125 gm control feed sample and six 16.125 gm medicated feed samples were weighed. Petroleum ether and hexane washes were carried out as per Example 11. The samples were suspended in 65 ml of acid-alcohol, mixed and digested for 48 hours. After the digestion period the samples were again mixed, centrifuged and decanted into cuvettes and read at 590 mu on a Beckman spectrophotometer. Initial reading exceeded 1.000 optical density, therefore, the samples in the cuvettes were diluted 1:1 with acid-alcohol and re-read. (Notation was made to multiply the ug/ml extraction by 2 to compensate for the 1:1 dilution.)

Total μg.

| | | |
|---|---|---|
| 1. | 2.563 × 130 = | 333.19 |
| 2. | 1.140 × 65 = | 74.10 |
| 3. | 0.337 × 65 = | 21.91 |
| 4. | 0.086 × 65 = | 5.59 |
| 5. | 0.018 × 65 = | 1.17 |
| | | 435.96 μg gentian violet recovered from No. 1 sample of 16.125 gm feed. |

Samples 2, 3, 4, 5, and 6 were calculated in exactly the same manner.

Calculations:

$$\frac{\text{O.D. sample}}{\text{O.D. 1 ppm (from std. curve)}} \times \frac{\text{ml ac–EtOH}}{\text{per extraction}} = \frac{\mu\text{g gentian violet recovered}}{\text{per extraction}}$$

Sample No. 1

$$\frac{.715}{.279} \times 130 \text{ ml } ac\text{–}EtOH = 2.563 \times 130 \; (2 \times 65) = 333.19 \; \mu g$$

$$\frac{.318}{.279} \times 65 \text{ ml } ac\text{–}EtOH = 1.140 \times 65 = 74.10 \; \mu g$$

$$\frac{.094}{.279} \times 65 \text{ ml } ac\text{–}EtOH = 0.337 \times 65 = 21.91 \; \mu g$$

$$\frac{.024}{.279} \times 65 \text{ ml } ac\text{–}EtOH = .086 \times 65 = 5.59 \; \mu g$$

$$.005 \times 65 \text{ ml } ac\text{–}EtOH = .018 \times 65 = 1.17 \; \mu g$$

435.96 μg recovered from Sample No. 1

Samples 2, 3, 4, 5 and 6 were calculated in the same manner. The ug extracted for the 6 samples were averaged. The high and low samples were averaged. The high and low samples were deleted and the remaining 4 samples were averaged for agreement.

average of 6 samples = 403.98 ug gentian violet recovered/sample.
average of 4 samples = 402.09 ug gentain violet recovered/sample.

$$\frac{193.5 \text{ gm feed}}{16.125 \text{ gm/sample}} = 12 \text{ samples of } 16.125 \text{ gm each.}$$

| | | | SAMPLE NO. | | | | | ml ac-EtOH Used | |
|---|---|---|---|---|---|---|---|---|---|
| | | 1 | 2 | 3 | 4 | 5 | 6 | | |
| | 1 | .715 | .655 | .620 | .660 | .665 | .640 | 65 ml | (X2 for dilution) |
| Extraction no. | 2 | .318 | .300 | .282 | .300 | .300 | .278 | 65 ml | |
| | 3 | .094 | .094 | .090 | .084 | .090 | .089 | 65 ml | |
| | 4 | .024 | .021 | .017 | .024 | .025 | .029 | 65 ml | |
| | 5 | .005 | .000 | .000 | .008 | .010 | .011 | 65 ml | |
| | 6 | .000 | .000 | .000 | .000 | .000 | .000 | | |
| | 7 | .000 | | | .000 | .000 | .000 | | |

Calculation $\frac{\text{O.D.* sample}}{\text{O.D. 1 ppm (from Std. curve)}} \times \text{ml } ac\text{–}EtOH = \frac{\mu\text{g gentian violet}}{\text{per extraction}}$

*O.D. means optical density.

402.09 ug × 12 samples = 4825 ug/193.5gm feed sample =4.825 mg gentian violet recovered from 193.5gm residual feed.

193.5gm × .0148 mg/gm = 2864ug = 2.864mg gentian violet calculated to be in the residual feed.

4.825mg − 2.864mg = 1.961mg gentain violet retained in the feed due to feeding habits of birds.

681 gm feed (14ppm) prepared for trial.

681 gm × .0148 mg/gm feed = 10.08 mg gentian violet in 681 gm/feed.

mg in feed (prepared for trial) − mg recovered (from residual feed) = mg consumed by bird to be recovered in droppings.

10.08 mg − 4.825 mg = 5.255 mg gentian violet consumed by bird to be recovered in droppings. The gentian violet extraction from the dropping as per the above instructions, extraction from the feed were calculated as above; and the total gentian violet recovered from droppings calculated.

$$\frac{\text{mg recovered from droppings}}{\text{mg consumed by bird}} = \frac{\text{\% gentian violet recovered}}{\text{droppings of the bird.}}$$

EXAMPLE 11

Example 11 was repeated, except that spiked samples of poultry feed and manure were prepared and used in place of actual poultry feed and manure samples. A control was used, i.e., a blank. Solutions of 10.0, 5.0, 4.0, 3.0, 2.0, 1.0, 0.5, 0.25, and 0.0 (blank) mcg of gentian violet per milliliter of water were prepared and added to 5 gm. of first the feed and then the manure in order to prepare spiked samples. These samples were treated as in Example 11. The final spectrophotometric readings served as a method of checking the accuracy of the analysis process of Example 11. This example represents the preferred embodiment of this aspect of this invention.

What is claimed is:

1. A method of treating Candida albicans infections in the digestive tract of poultry which comprises feeding to poultry having said infection an effective fungicidal amount of a basal poultry feed containing gentian violet in an amount between 0.00077 and 0.01 percent by weight.

2. The method of claim 1 wherein said feed contains between 0.00155 and 0.01 percent by weight of gentian violet.

3. A method of treating *Candida albicans* infections in the digestive tract of poultry which comprises administering to poultry having said infection a fungicidal amount of an aqueous solution containing gentian violet in an amount between 0.001 and 0.05 percent by weight.

* * * * *